UNITED STATES PATENT OFFICE.

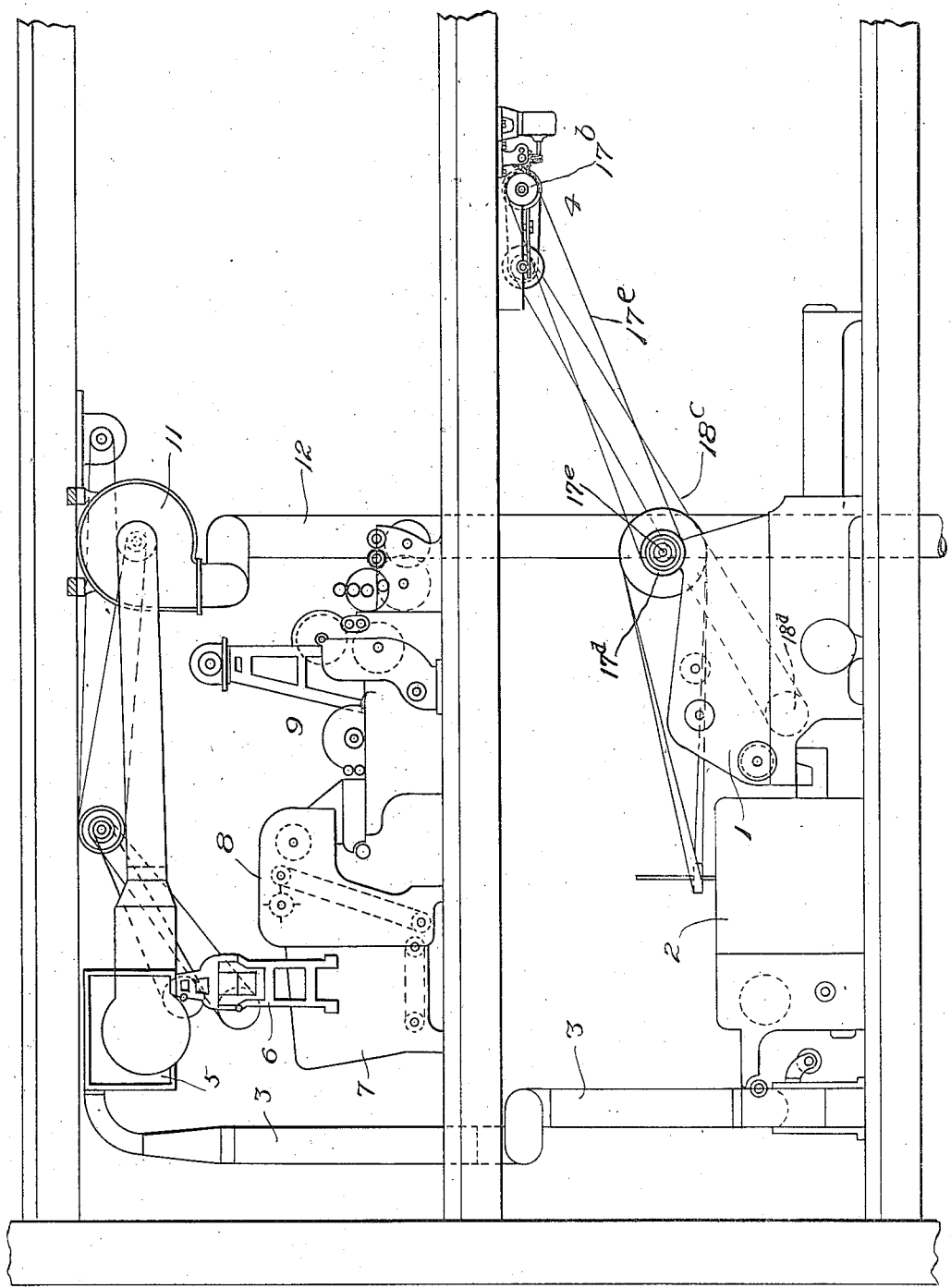

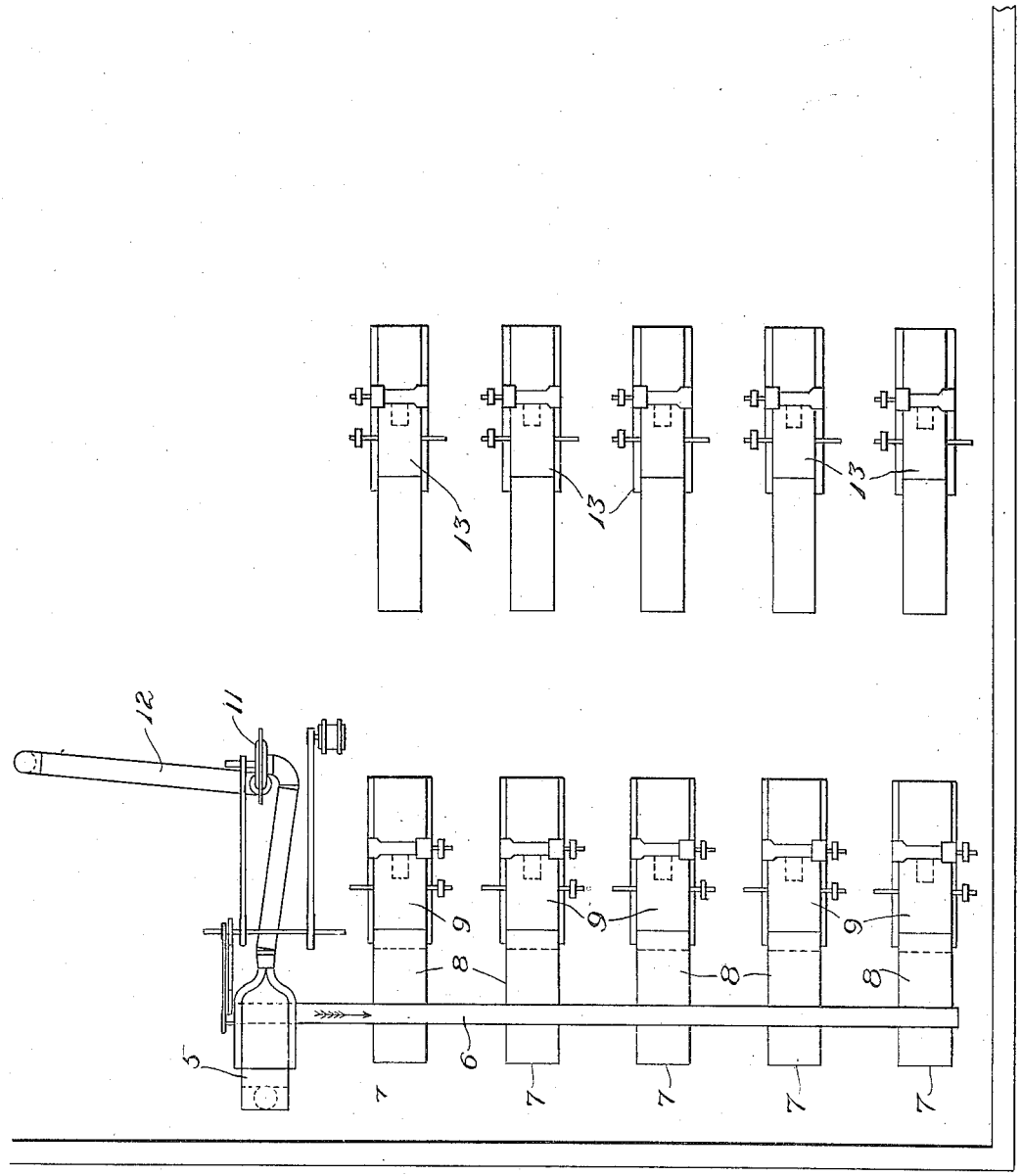

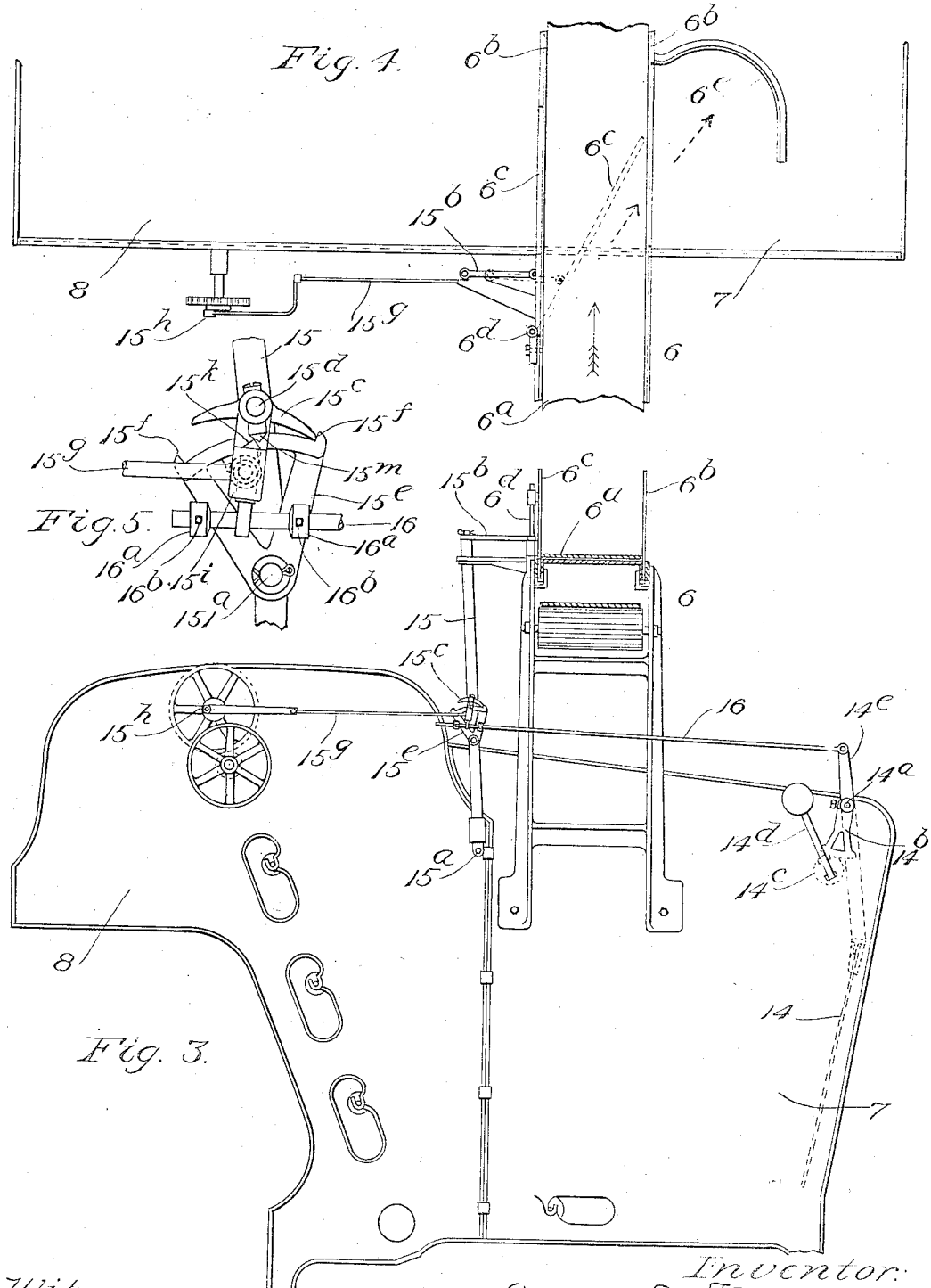

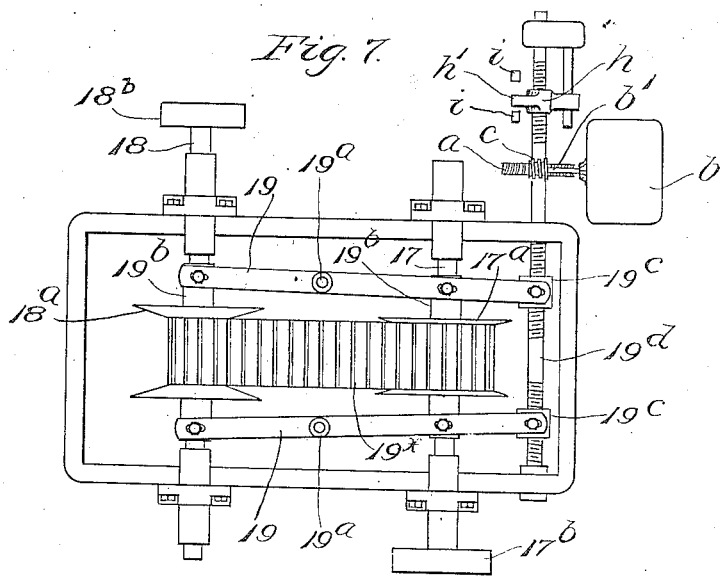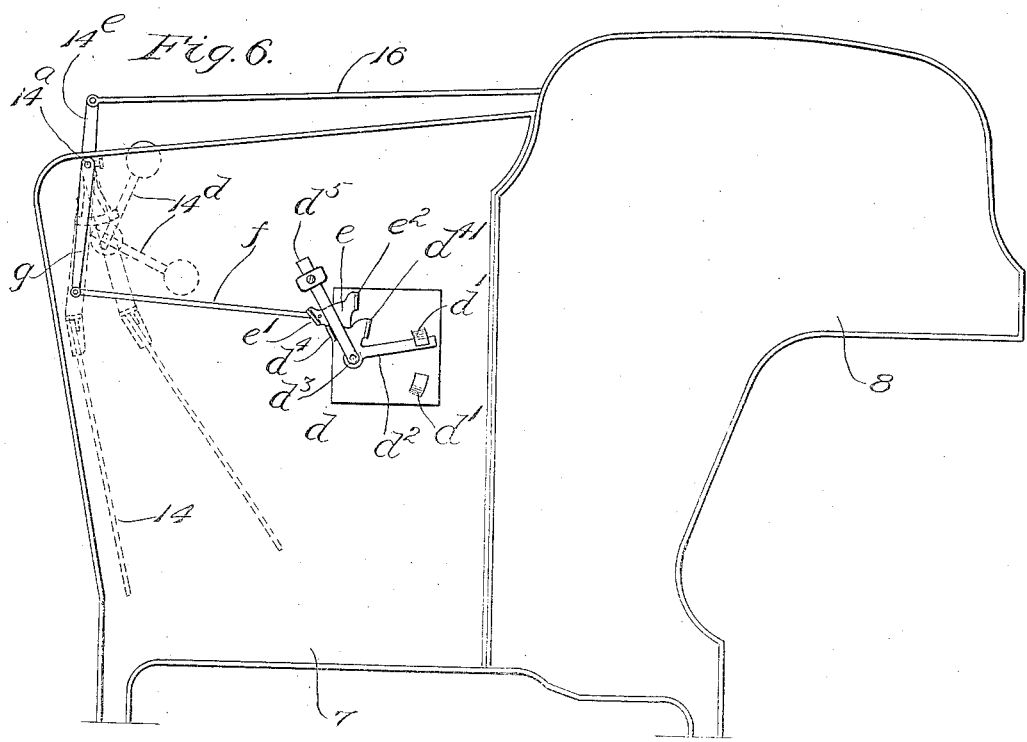

ARTHUR S. THOMAS, OF WHITNEY, SOUTH CAROLINA.

COTTON-PREPARING MACHINERY.

1,407,500.      Specification of Letters Patent.     Patented Feb. 21, 1922.

Application filed January 15, 1921. Serial No. 437,487.

*To all whom it may concern:*

Be it known that I, ARTHUR S. THOMAS, a citizen of the United States, residing at Whitney, in the county of Spartanburg, State of South Carolina, have invented a certain new and useful Improvement in Cotton-Preparing Machinery, of which the following is a specification, reference being had therein to the accompanying drawings.

The invention provides for automatic regulation of the rate at which cotton is supplied from the bale-breakers located in one part of a cotton mill to the feeder-hoppers of the machines located in a different part of the mill which next operate upon cotton.

In up to date mills, the cotton from one or more bale-breakers, usually two, is conveyed by a conveyor-system, either belt or pneumatic, to apparatus by which it is distributed to the hoppers of the self-feeders of a group of pickers, sometimes termed breaker-lappers. A distributor of the usually approved type comprises an endless traveling belt located above the feeder-hoppers and extending lengthwise of the series thereof, and devices, controlled by feelers or rakes in the hoppers, by which cotton carried by the belt is diverted from the latter into any hopper which needs additional cotton to keep it filled to the extent required for satisfactory results in the operation of the corresponding picker. The aim in practice is to operate the bale-breaker or breakers at a speed sufficient to afford an adequate supply of cotton for all the feeder-hoppers of the series. Any excess remaining upon the belt after passing the last feeder-hopper is discharged upon the floor adjoining such hopper. In actual practice, different causes produce variations in the amount of cotton supplied by the bale-breaker or breakers; for instance, differences in the density of the baled cotton that is fed to the bale-breaker or breakers from bales, differences in atmospheric conditions, and irregularities in the feeding of the bale-breaker or breakers. Such varations in the amount supplied give rise to two troubles. In case more cotton is received by the distributor belt than the feeder-hoppers require, the discharge of the excess upon the floor at the end of the series of feeder-hoppers entails considerable extra work upon the operator, and also increases the fire hazard. In case the bale-breaker or breakers fail to deliver enough cotton to keep all of the feeder-hoppers supplied with the proper amount of cotton, the last feeder-hopper of the series will run low, and may even become emptied, necessitating stoppage of the feeder and the associated picker until the deficiency in supply has been remedied. Moreover, when a hopper receives less cotton than is required for good results, the weight of the laps formed by the corresponding picker will be below standard.

Communication between the operator in attendance upon the pickers, feeders, and distributor, located in one part of the mill and the operator who feeds and tends the bale-breaker or breakers located in a more or less remote different part is indirect and inconvenient. Usually there is considerable distance between the two locations; thus, commonly, the bale-breaker or breakers is in one room, and the pickers, feeders and distributor in another. Often, they are on different floors.

By my invention, I obviate these and other drawbacks and objections. In accordance therewith, I combine with variable-speed bale-breaker driving means, means controlled by the contents of the last hopper of a series of feeder-hoppers and in turn automatically controlling the said variable-speed driving means and thereby regulating the rate of delivery of fiber from the bale-breaker or breakers to the distributor system. An illustrative embodiment of the invention is illustrated in the accompanying drawings, in which latter,—

Fig. 1 shows after the manner of an elevation certain equipment contained in the bale-breaker and picker rooms of a cotton mill, on two of the floors of the latter.

Fig. 2 shows the lay-out of the apparatus and machines in the picker room of Fig. 1.

Fig. 3 shows in side elevation one of the self-feeders of Figs. 1 and 2, and certain parts belonging to the distributor system.

Fig 4 is a plan view of certain portions of Fig. 3.

Fig. 5 is a detail view of some of the devices for operating one of the gates or switches of the distributor.

Fig. 6 is a side elevation of the last self-feeder of the series, showing applied thereto certain devices pertaining to the invention.

Fig. 7 is a plan view showing the variable-speed bale-breaker driving mechanism and certain associated devices pertaining to the invention.

For illustrative purposes I have represented in Fig. 1 a general arrangement in which the bale-breaker room is on the lower of the two floors that are partly represented, and the picker room is on the upper of said floors. This is an arrangement that is approved in practice, according to circumstances, but the invention is applicable equally in the case of other general arrangements. A bale-breaker 1 and an opener 2 of vertical type receiving cotton which has passed through the bale-breaker are represented as located upon said lower floor, and 3, 3, are flues of a pneumatic conveyor-system by which cotton discharged from the one or more bale-breakers and openers employed is transferred to the picker room on the floor above. At 4 is indicated the variable-speed driving mechanism in connection with the bale-breaker. In practice it is usual to employ two bale-breakers side by side, and openers associated therewith delivering to a given conveyor-system. The condenser to which the said flues deliver the cotton is indicated at 5, it being located in the picker room, and arranged to deliver to the distributor 6 by which the cotton is distributed to the hoppers 7, 7, of the self-feeders 8, 8, which feed the series of breaker-pickers 9, 9. The exhaust-fan connected with the condenser is represented at 11, Figs. 1 and 2, and at 12 are indicated portions of the flues through which air is discharged from said fan. Fig. 2 indicates the series of intermediate pickers or lappers 13, 13, to which the laps formed by the breaker-pickers are taken from the latter.

The distributor 6 that is partly shown in Figs. 3, 4, and 5 is of the well-known type having a traveling cotton-carrying belt $6^a$ to which the condenser delivers the cotton passing therethrough; said belt extending horizontally above the series of hoppers, lengthwise of the series, with lateral cotton-confining walls $6^b$, $6^b$, at the opposite side-edges of the belt. Also, having adjacent said belt a series of gates or switches, $6^c$, $6^c$, one for each hopper and controlled by the cotton contained in the latter, each gate hinged by means of a vertical pivot $6^d$ at one end thereof at one edge of the belt. Normally, that is to say while the corresponding hopper contains a sufficient amount of cotton for the time being, each gate occupies at such edge a position indicated in full lines in Fig. 4 parallel with the length of the belt, in which it does not interfere with the cotton that is being carried along by the belt. When the supply contained in the hopper becomes so far diminished that it calls for replenishment, the gate is caused automatically to swing transversely across the belt into the dotted line position shown in Fig. 4 in which it extends obliquely across the upper run of the belt. When in this position it performs its function of diverting the cotton that is carried by the belt, from the latter through an opening in the opposite side-wall $6^b$ so that after striking the hollow surface of a fixed concave $6^e$ it falls into the hopper.

The automatic control of the gates or switches $6^c$, $6^c$, is provided for in general practice by means of a feeler or rake 14 in each of the respective hoppers, arranged to be acted upon by the contents of the hopper, and in turn acting through intermediate devices to control the position of the corresponding gate or switch. The feeler or rake is hung in a substantially vertical position within the hopper, near one end of the latter, by means of a supporting shaft $14^a$ which is mounted in bearings in connection with the upper portions of the opposite sides of the hopper. It is yieldingly actuated with a tendency to swing it toward the delivery end of the feeder, usually through means of a toothed segment $14^b$ attached to one outwardly projecting end-portion of shaft $14^a$ and a gear $14^c$ meshing with said segment and having connected therewith a weighted arm $14^d$. When the hopper is full of cotton, the latter presses the feeler or rake backward; when the contents diminish, the decreased volume permits the feeler or rake to swing forward toward the said delivery end. As the feeler or rake swings forward, it brings about action of the gate-actuating devices to cause the gate to be swung from its full-line position in Fig. 4 into its dotted-line working position, so that it will deflect the cotton that is being carried onward by the belt, from the latter into the hopper, as indicated by the dotted arrows in such view. As the additions thereupon made to the cotton within the hopper increase the volume, and the latter presses the feeler or rake back, the feeler or rake brings about action of the gate-actuating devices to cause the gate to be swung from its dotted-line working position to its full-line retracted position, so as to discontinue the supply to the hopper and permit the cotton to pass along on the belt. This action occurring, as conditions govern, in connection with each of the feeders, keeps the hoppers of all of the latter duly supplied with cotton. The usual actuating devices for a gate comprise an upright lever 15 mounted upon a pivot $15^a$ at its lower end, a rod $15^b$ connecting the lever to the gate, a double-pawl $15^c$ pivoted upon a pivotal stud $15^d$ carried by the lever, a segment $15^e$ hung upon a pivot $151^a$ carried by lever 15, and furnished with opposite teeth or shoulders $15^f$, $15^f$, a connecting rod $15^g$, and a rotating crank $15^h$ to which said segment is connected by the rod $15^g$.

The double-pawl 15ᶜ is furnished with an arm 15ˡ carrying a spring-pressed plunger 15ᵏ having a V-shaped end adapted to work in cooperation with a V-shaped abutment 15ᵐ fixed to the pivotal stud 15ᵈ, to hold the double-pawl in its opposite working positions with relation to the teeth of segment 15ᵉ. The rotating crank imparts a to-and-fro swinging movement to the segment, for the purpose of actuating the gate-lever through engagement of one of the teeth or shoulders 15ᶠ, 15ᶠ, with the corresponding end of double-pawl 15ᶜ. Such engagement is controlled from the feeler or rake through intermediate parts comprising a rod 16 having one end thereof connected to an arm 14ᵉ extending upward from the shaft 14ᵃ and its other end-portion passed through a hole in the said arm 15ⁱ, and collars 16ᵃ, 16ᵃ, mounted upon the rod 16 at opposite sides of arm 15ⁱ and fixed in place by clamping screws 16ᵇ, 16ᵇ, so that their positions upon the rod may be adjusted lengthwise of the latter to secure the right results in operation.

The general construction and arrangement as thus far referred to and described are as heretofore, and the general mode of operation is as heretofore.

Fig. 7 represents the essential features of a form of speed-varying driving mechanism which is at present in general use, and Fig. 1 illustrates such a mechanism operatively combined with the bale-breaker. Referring to Fig. 7, the said mechanism comprises a driving shaft 17, a driven shaft 18, expanding pulleys 17ᵃ, 18ᵃ, on the respective shafts, a belt or band 19ˣ passing around the two pulleys and transmitting power from shaft 17 to shaft 18 to rotate the latter, a band-pulley 17ᵇ on shaft 17 to which a driving-band 17ᵉ, Fig. 1, extends from a pulley 17ᵈ on countershaft 17ᶜ to rotate the shaft 17, and a band-pulley 18ᵇ on shaft 18 from which a driving-band 18ᶜ extends to a pulley 18ᵈ in connection with the bale-breaker 1, to actuate the latter. The rate at which the driven shaft 18 is driven is varied in order to vary the rate at which the bale-breaker is operated, by varying the diameters of the two expanding pulleys. This is provided for by means of the levers 19, 19, located at opposite sides of the expanding pulleys, such levers being mounted upon pivots 19ᵃ, 19ᵃ, intermediately located with relation to the two shafts 17, 18, and engaged at opposite sides of the pivots 19ᵃ, 19ᵃ, with the expanding devices 19ᵇ, 19ᵇ, of the respective pulleys. The levers are engaged at one end of the mechanism with nuts 19ᶜ, 19ᶜ, upon the right-and-left screw-threaded portions of an adjustment-shaft 19ᵈ so that when the said shaft is rotated in one direction it will cause the nuts to approach each other, and thereby operate the levers to cause one pulley to expand and the other to contract in diameter; and when the shaft is rotated in the other direction it will move the nuts away from each other, and thereby reduce the diameter of the former pulley and expand the latter one.

In the case of this embodiment of the invention I provide for carrying the invention into effect by employing means for automatically rotating the adjustment-shaft 19ᵈ under the control of the feeler or rake in the last feeder-hopper of the series. For the purpose of rotating the said shaft by power, I have provided in this instance a worm-gear $a$ thereon, and a reversible electric motor $b$ having upon the shaft $b'$ of its rotor a worm $c$ engaging with the said worm-gear. The circuit-connections of the said reversibly-driven motor include a switch $d$, Fig. 6, which is operatively combined with the said feeler or rake. The form of switch illustrated in Fig. 6 comprises opposite fixed contact-members $d'$, $d'$, and a movable contact-arm $d^2$ which is hung pivotally at $d^3$ and adapted to make contact with the said fixed contact-members alternately. For the actuation of the movable contact-arm it is furnished with opposite lugs $d^4$, $d^{41}$, upon a portion thereof extending upward above the pivot $d^3$, and an upright weighted tumbler-arm $d^5$ is mounted upon the said pivot and extends upward between such lugs. An actuator-segment $e$ also mounted upon pivot $d^3$, and provided with lugs $e'$, $e^2$, at front and rear, respectively, of tumbler-arm $d^5$, is connected by a rod $f$ with an arm $g$ fixed upon the supporting shaft of the said feeler or rake within the last feeder-hopper of the series.

The action of the devices which have just been specified will be obvious. Briefly stated, it is as follows: Assume the parts of Fig. 6 to be in the positions represented in such figure. As the last feeder-hopper is emptied through the action of the feeder of which it is a part or with which it is associated, the movement of the feeler or rake forward within the hopper from one of the positions indicated in Fig. 6 toward the other is accompanied by a swinging of the actuator-segment $e$ causing its lug $e'$ to engage tumbler-arm $d^5$ and move the latter until its center of gravity has passed beyond the axis on which the said arm swings. Thereupon the arm will fall in the same direction and by striking against the lug $d^{41}$ will turn the movable switch-arm $d^2$ so as to take it out of engagement with the upper fixed contact-member $d'$ and carry it into engagement with the lower fixed contact-member. Thereby the motor will be caused, through its circuit-connections, to rotate in a direction to bring about an adjustment of the variable-speed mechanism which will increase the rate at which the bale-breaker is operated, and thereby the rate at which the cotton is furnished to the distributor will be increased so that the amount carried forward past the other feeder-hoppers will suffice, after these have been supplied with the amount of cotton required by their feeders and pickers, to supply the deficiency in the last feeder-hopper before the contents of such feeder-hopper have become exhausted. As, now, the last feeder-hopper fills, and the volume of cotton contained therein operates to press back the feeler or rake from its right-hand position in Fig. 6 to the left-hand position in such figure, the switch will be operated from the said feeler or rake to cause movements of the actuator-segment, tumbler-arm, and movable contact-member, in the reverse direction, so as thereby to move the movable contact-member away from the lower fixed contact and into engagement with the upper fixed contact. Thus, the motor will be caused to rotate in the direction opposite to that in which it last was rotated, and the variable-speed driving mechanism will be adjusted automatically to cause the rate at which the bale-breaker is operated to be reduced, so as thereby to reduce the amount of cotton received by the distributor.

My invention is designed to enable the working to be so governed that on the one hand there shall be no objectionable deficiency in the amount of cotton supplied to the last feeder-hopper of the series, and on the other there shall be no excess, or practically none, to be discharged from the extreme end of the distributor-belt after passing the last feeder-hopper.

I have provided in this instance against adjustments of the speed-varying mechanism to an extent too far in either direction by providing the adjustment shaft, Fig. 7, with a threaded extension and mounting thereon a follower or traveler constituted by a nut $h$ having a finger $h'$ which plays between two oppositely located members $i$, $i$, of a suitable circuit-controlling device. These parts are arranged to operate so that in case the adjustment shaft is rotated too continuously and too far in either direction the traverse of the follower or traveler will cause it to engage with one or the other, as the case may be, of the said members and thereby actuate the said circuit-controlling device to open the circuit and thereby discontinue the rotation of the motor.

The invention is not limited to the particular construction and mode of carrying the same into effect herein illustrated and described.

What is claimed as the invention is,—

1. In cotton-preparing machinery, the combination with a bale-breaker, variable-speed driving means therefor, a series of feed-hoppers, and means by which the fiber is conveyed from the bale-breaker and distributed to the said hoppers, automatically delivering to the respective hoppers at a rate controlled by the contents of the individual hoppers, of means controlled by the contents of the last hopper and in turn automatically controlling the said variable-speed driving means and thereby regulating the rate of delivery of fiber from the bale-breaker to the distributor system.

2. In cotton-preparing machinery, the combination with a bale-breaker, variable-speed driving means therefor, a series of feed-hoppers, and means by which the fiber is conveyed from the bale-breaker and distributed to the said hoppers, automatically delivering to the respective hoppers at a rate controlled by the contents of the individual hoppers, of a feeler controlled by the contents of the last hopper of the series, a circuit-controller operatively connected with the said feeler, and an electric-circuit embracing electrically-actuated means controlling the said variable-speed driving means and thereby regulating the rate of delivery of fiber from the bale-breaker to the distributor system.

3. In cotton-preparing machinery, the combination with a bale-breaker, variable-speed driving means therefor, a series of feed-hoppers, and means by which the fiber is conveyed from the bale-breaker and distributed to the said hoppers, automatically delivering to the respective hoppers at a rate controlled by the contents of the individual hoppers, of a feeler or rake in the last hopper of the series, controlled by the contents of such hopper, a tumbler operatively connected with said feeler or rocker, and an electric-circuit embracing a switch operated by the said tumbler and electrically-actuated devices controlling the said variable-speed driving means and thereby regulating the rate of delivery of fiber from the bale-breaker to the distributor system.

4. In cotton-preparing machinery, the combination with a bale-breaker, variable-speed driving means therefor, a feed-hopper, and means by which fiber is conveyed from the bale-breaker and delivered to the said feed-hopper, of means controlled by the contents of the feed-hopper and in turn automatically controlling the said variable-speed driving means and thereby regulating the rate of delivery of fiber from the bale-breaker to the conveyor-system.

5. In cotton-preparing machinery, the combination with a bale-breaker, variable-speed driving means therefor, a feed-hopper, and means by which fiber is conveyed from the bale-breaker and delivered to the said feed-hopper, of a feeler controlled by the contents of the feed-hopper, a circuit-controller operatively connected with the said feeler, and an electric-circuit embracing electrically-actuated means controlling the said variable-speed driving means and thereby regulating the rate of delivery of fiber from the bale-breaker to the conveyor-system.

In testimony whereof I affix my signature in presence of two witnesses.

ARTHUR S. THOMAS.

Witnesses:
  A. F. SANDERS,
  C. C. HOLT.